3,205,593
SATELLITE ORBIT DEMONSTRATING APPARATUS
John Frederick Busey, 1001 E. Strong St., Pensacola, Fla.
Filed Oct. 9, 1963, Ser. No. 315,001
5 Claims. (Cl. 35—46)

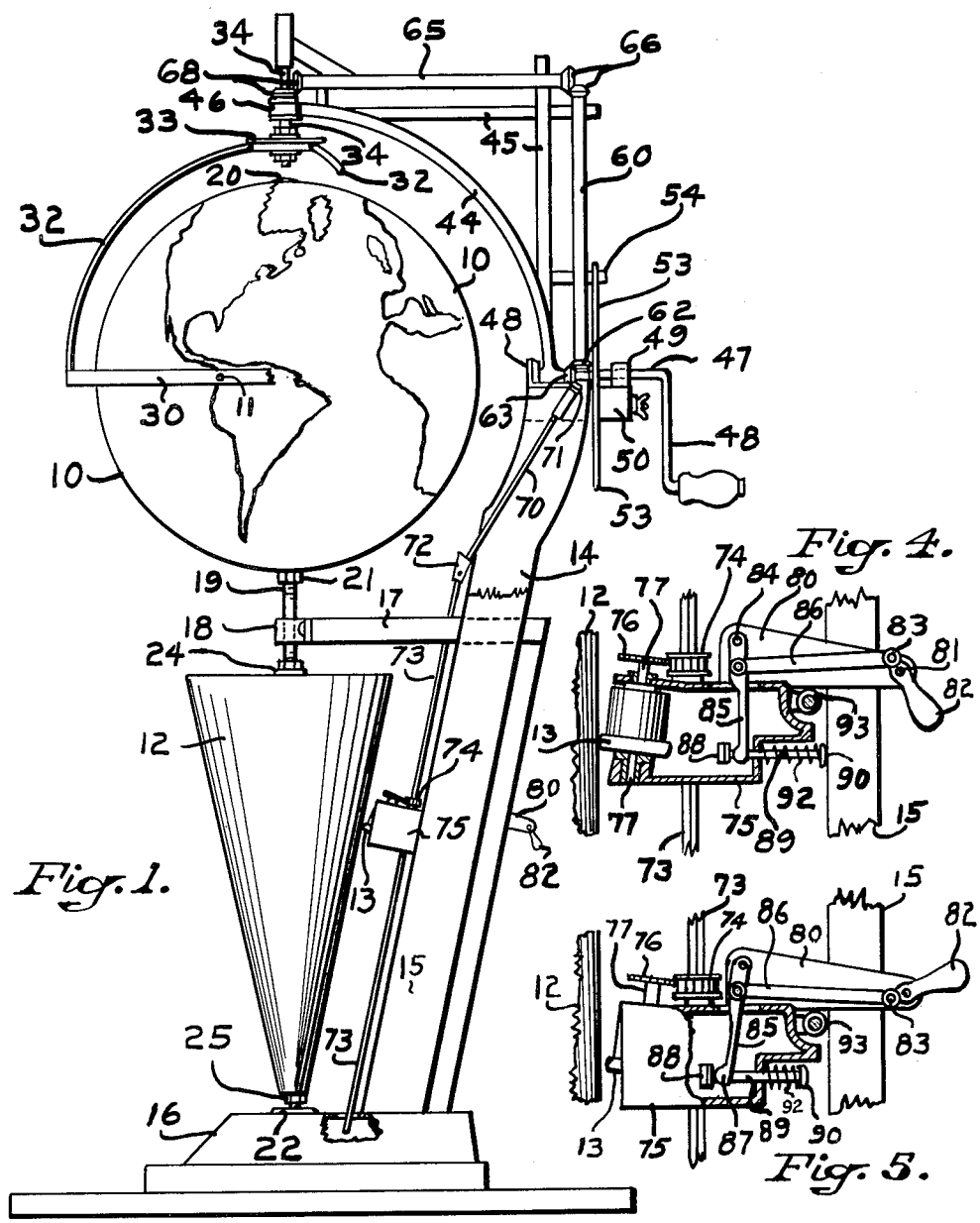

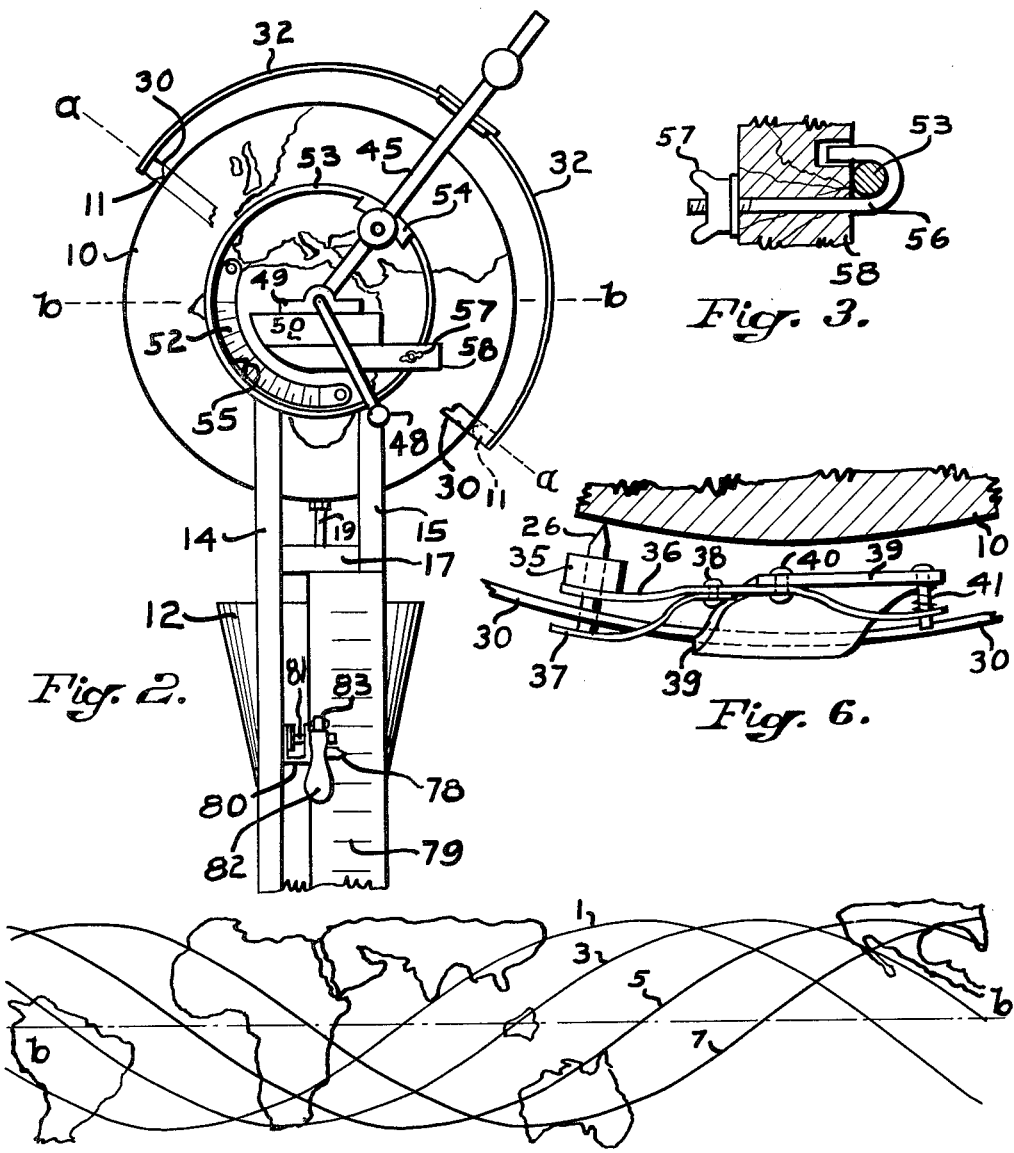

This invention relates to a satellite orbit demonstrating apparatus, and more particularly to a mechanism which demonstrates the path and the orbit period of a satellite orbiting around and relative to the rotating earth.

It is difficult for the layman to visualize the course of a satellite fired from the earth as indicated by the sinuous lines drawn on a flat surface which represent the several orbiting passages, and particularly to determine the location of the satellite at any predetermined time. That is, it is often asked as to when the satellite known a Echo II, which is now orbiting the earth, will be visible at a given locality.

It is the primary object of this invention to provide an apparatus for demonstrating the passage of a satellite, including a space craft carrying an astronaut, which is orbiting the earth and to show its path of movement relative to a rotating globe representing the earth, as well as to correlate the relative times of earth rotation and satellite revolution so as to show the position of the satellite over a given locality at any given time.

A further object is to provide apparatus of this type which provides for varying the angularity of the orbiting path relative to the earth equator and to show the width of the zone through which the satellite passes.

Another object is to provide a change-speed mechanism whereby the time of an orbit of the satellite around the globe may be varied relative to the globe rotation so as to simulate the travel of a satellite at different distances from the earth and orbit periods.

Further objects will be apparent in the following disclosure.

In accordance with this invention, I have provided a globe simulating the earth which is mounted for rotation. An indicator or a marking device, such as a crayon or pencil, which simulates a satellite is revolved about the globe at a rate which may be varied relative to the globe rotational speed so as to indicate both the relative movements of the satellite and the earth and the position of the satellite over the earth at a given time in the satellite revolution. The satellite must be ejected from the earth within a given range of velocity in order to maintain its path of orbiting around the earth, but that speed may be varied within the limits of the satellite falling back to the earth or of leaving the gravitational influence of the earth. Hence, the apparatus is so constructed as to provide for a variation in the speed of the satellite indicator relative to that of the globe. Furthermore, the apparatus provides for changing the angularity of the satellite path to the globe equator and thereby predetermine the width of the zone through which the satellite passes. If that angle is made zero, then the satellite will orbit on the globe equator. If the angle is made to equal 90°, then the satellite passes north to south across the globe axis poles and so travels nearly on globe meridians, the spacing of which is dependent upon the relative speeds of the satellite and the earth. If the angle of the satellite path is 40° relative to the equator, then the satellite orbits the globe in an equatorial band between 40° north latitude and 40° south latitude. The satellite is always orbiting in a diametrical plane coinciding with or at an angle to the globe equatorial plane which is perpendicular to the axis. The purpose of the apparatus is to demonstrate these and various other facts.

Referring now to the drawings illustrating one embodiment of the invention:

FIG. 1 is a vertical perspective elevation of the apparatus, with parts removed for clarity and showing outlines of continents and countries on an earth-simulating globe;

FIG. 2 is a similar fragmentary elevation at right angles to the view of FIG. 1;

FIG. 3 is a sectional detail of the clamp and indicator ring which fixes the angularity of the satellite path;

FIG. 4 is a sectional fragmentary detail of the change-speed mechanism which adjustably controls the satellite speed, and comprises a power driven friction roller in contact with a cone which rotates the globe;

FIG. 5 is a similar view showing the positions of the parts when in a non-driving relationship;

FIG. 6 is a fragmentary detail of the marker holding device; and

FIG. 7 is a view of some of the satellite markings on the globe when applied on a plane.

One embodiment of this invention comprises a globe 10 simulating the earth which is mounted for rotation about its polar axis and a satellite simulator 11 (FIG. 2), which may be a marking device (FIG. 6), mounted to revolve about the globe in a diametrical plane, such as indicated by the line a—a in FIG. 2 or which may coincide with the equatorial plane b—b of the globe or be adjusted to a desired angle relative thereto. Power mechanism, such as a crank drive, serves to rotate the globe about its polar axis and to revolve the indicator in its plane at a speed which is coordinated with the globe rotational rate. The speed at which the satellite 11 moves about the globe may be varied by a change-speed mechanism, to be described, which is calibrated to give the satellite a desired rate of travel relative to the rate of globe rotation. The globe and the satellite are driven members which are in turn driven by the power mechanism, and the drives are so arranged as to revolve the satellite at the required rate at whatever may be the tilt of its plane of travel relative to the globe equator. The preferred form of change-speed drive mechanism comprises a cone 12 connected to rotate with one of the driven members which is engaged by a friction roller 13 mounted to engage the cone at an adjusted position relative to the cone surface, so that the cone is frictionally rotated at a rate depending upon the position of the driving roller 13. The roller 13 is rotated at a rate coordinated with the rate of the other driven member and is driven directly by the power mechanism. The relative rates of the indicator and the globe are therefore varied by moving the roller along the peripheral surface of the cone, so that when the roller is near the smaller diameter portion of the cone, the rotational speed of the cone is maximum, and when the roller engages the larger diametrical surface of the cone, then the rotational rate of the cone is minimum.

Referring to FIGS. 1 and 2, the earth-simulating globe 10 is axially aligned with and connected to rotate about a common axis with the driven cone 12. The globe is preferably marked with a map or an outline of the various continents and countries of the earth, and it may be a standard globe sold on the market. The globe and cone are mounted on a framework comprising a pair of uprights or standards 14 and 15 mounted on a suitable base 16. A bracket or arm 17 is mounted between and projects horizontally from the uprights, and this has a suitable bearing 18 at its outer end within which rotates a spindle 19. The spindle 19 may pass upwardly through axially aligned holes in the globe and be connected to a metal cap 20 on the top of the globe. A nut 21 beneath the globe threaded on the spindle 19 serves to hold the globe in position against the cap 20. The spindle 19 passes axially through the cone and is stepped or mounted on a suitable thrust bearing 22 in the base 16. Nuts 24 and 25 threaded onto the spindle serve to hold the top and bottom of the cone clamped therebetween. The spindle 19 is axially vertical and holds the globe for rotation on its polar axis represented by that spindle.

The satellite, as represented by the indicator or pointer 11 (FIG. 2), may be a marking pencil or crayon 26 (FIG. 6) arranged to draw a line on the globe surface, if desired. That satellite indicator is mounted to rotate in approximately a diametrical plane of the globe. The plane of travel of the indictaor 11 is preferably shown by a narrow cylindrical strip or ring 30 encircling the globe which coincides with or is closely parallel to the diametrical plane *a—a*, and thus gives a visual indication of the path of travel of the satellite. This metal strip 30 is supported by a set of arcuate metal strips 32 connected as by soldering or welding to the circular strip 30. These strips 32 are connected to a metal disc 33 above the globe which is suitably mounted on an axle 34 aligned with the axle 19. The members 30, 32, 33 and 34 are mounted as shown in FIG. 1 to move the indicator or marker 26 about the globe and preferably in marking contact therewith. The marker crayon 26 (FIG. 6) may be removably mounted in a cylindrical hole in a support 35 carried on the end of a metal strip 36. A resilient metal strip 37 is held at one end by a rivet 38 on the strip 36 for a limited swinging movement and it thus serves to hold the crayon in position and to permit its replacement. The strip 36 is loosely mounted on a plate 39 rigidly fixed to and projecting laterally from the ring 30. A rivet 40 carried by the plate 39 in a fixed position passes loosely through a hole in the strip 36 and thus permits a slight tilting movement of the strip. A compression spring 41 is suitably held between the strip 36 and the fixed part 39 and thus urges the strip 36 to tilt the crayon 26 into contact with the globe 10 and draw a line thereon as the globe rotates and the marker, which simulates the satellite, travels in its own diametrical plane about the rotating globe. Various refinements may be incorporated in this construction.

The framework which carries the indicator supporting ring 30 comprises an arcuate frame member 44 (FIG. 1) and suitable strengthening members 45 fixed together. The upper end of the arcuate member 44 carries a bearing 46 within which the axle 34 is mounted. This axle is held axially immovable in its bearing and provides a tiltable support for the satellite indicator ring 30.

To provide for adjusting the relative angularity or tilt of the globe equator and the plane of the ring 30, the framework comprising the frame member 44 is mounted at its lower end on an axle 47, which, as shown, has a crank handle 48 fixed thereto and forms a manual power drive for the roller 13, as will be described. That axle 47 is mounted in two spaced horizontal bearing sleeves 48 and 49 carried on a lateral extension 50 on the tops of the uprights 14 and 15. That frame 44 may thus be tilted about the axis of the handle spindle 47. As shown in FIG. 2, the angularity of tilt of the frame 30 may be indicated by an arcuate gauge 52 adjustably mounted on the frame upright 14 and bearing angularity calibrations thereon. Movable relative to the gauge is a heavy wire 53 shaped as a circle which is attached to and fixed on the frame 44 by means of a clamp 54 and suitable guides or other means within which the slide ring is movable. This ring 53 has a pointer 55 or a mark which moves over or relative to the angle scale 52 and thus indicates the angularity of tilt of the satellite frame.

The satellite frame 30 may be fixed at the required angle of tilt by means of a suitable clamp (FIG. 3) which may comprise a U-shaped bolt 56 having a wing nut 57 on its other end. The circular ring 53 passes through the eye of that bolt, and the wing nut which is threaded on the bolt is arranged to engage the outer surface of a horizontal frame member 56 (FIG. 2) secured to the bottom of the cross piece 50 on the upright standards 14, 15. To tilt the satellite ring it is merely necessary to loosen the wing nut 57 and turn the circular frame 53 and the connected framework 44, 45 into the desired position and then clamp the nut in place. The markings on the scale 52 are so located that the globe equator and the plane of revolution of the satellite will coincide when the scale indicator is set at zero. If the indicator 55 on the ring 53 is set on the scale mark 38° on the scale 52, the satellite indicator will then move in a plane at an angle of 38° relative to the globe equator. When the satellite is traveling in that 38° angle plane, it will move between 38° north and south latitudes of the globe.

The driving connections for rotating the satellite framework are shown somewhat diagrammatically in FIG. 1, parts of the framework being omitted for clarity. This comprises a shaft 60 mounted in the plane of the frame members 44 and 45. The lower end of that shaft has a beveled gear 62 meshing a beveled gear 63 on the crank shaft 47 for transmitting the power. At the upper end of the framework is a horizontal shaft 65 suitably mounted in bearings, and the shafts 60 and 65 have beveled gears 66 in mesh so arranged that shaft 65 is suitably driven by the crank 48. The other end of the horizontal shaft 65 and the vertical shaft 34 have meshing beveled gears 68 keyed in place. Hence, for any angular position of the satellite framework relative to the globe equator, the satellite indicator marker 26 may be revolved in its plane and draw the satellite path on the globe surface and thus indicate its position and path.

The variable speed drive for the globe 10 comprises a shaft 70 which has its upper end suitably mounted in bearings on the standards 14, 15. This shaft has a beveled gear 71 meshing with the beveled gear 63 keyed on the crankshaft. A universal coupling 72 connects the shaft 70 with a shaft 73 which is substantially parallel with the outer surface of the cone but has its lower end free of a bearing and preferably located in a recess in the base. This shaft 73 is square in cross section or otherwise shaped to form a key drive for a gear 74 (FIG. 4) slidably mounted thereon above a housing 75. This gear 74 meshes with a gear 76 on the end of a roller shaft 77 carrying friction roller 13 which drives the cone 12. That roller shaft is suitably mounted in bearings in the housing. The roller 13 is intended to have frictional engagement with the outer surface of the cone 12 and thereby drive the cone and the globe connected with it at a rate which is determined by the adjusted position of the roller against the cone surface.

If the roller 13 (FIG. 1) is near the top of the cone, then the globe rotation is comparatively slow relative to that of the satellite, so that the latter is traveling fast around the earth simulating globe 10. If the roller touches farther down on the cone, then the satellite speed relative to the globe speed is slower. The housing has a pointer 78 (FIG. 2) connected thereto which is arranged to move over a scale 79 on the back of an extension of the standard 15. That scale is preferably calibrated to indicate the time of one orbit of the satellite around the earth or it may indicate velocity. For example, the speed of the satellite Echo II circumnavigating the globe has been about 118 minutes per orbit and the true orbit time for 360° about the earth of Astronaut Cooper was 88.6 minutes. In the preferred construction, the cone is sized to provide about 18¾ satellite orbits at its top and 3¾ at its bottom per earth revolution. That is, when the roller 13 engages the upper portion of the cone 12 at a given scale mark, the orbital time is one hour and 19.77 minutes. A mark opposite the lower portion of the cone represents an orbital rate of five hours and 59 minutes. This calibration may be reasonably accurate and thus make it possible to follow the travel of a satellite and determine when it will be in a certain position relative to the earth. That is, if an astronaut is started at a given velocity from a given point on the earth and at a known angle relative to the equator, the apparatus being set accordingly, it can be readily observed as to where that astronaut is located at any given hour of earth rotation, as is indicated in FIG. 7 by the path of Cooper's orbits 1, 3, 5 and 7 shown on a plane surface or as unwrapped from the globe. The apparatus thus gives a visual demonstration of the meaning of those curves, as one observes the marker transit within the latitude boundaries determined by the angle relative to the equator of the plane in which the astronaut or satellite was shot from the ground. The satellite orbits may be elliptical in their paths, but for my demonstration purposes they are considered circular.

The mechanism arranged for clamping the cone roller 13 against the cone surface is shown in simplified form in FIGS. 4 and 5. As there shown, the housing 75 which carries the cone driving roller 13 has the shaft 73 passing freely therethrough, and the axially movable driving gear 74 keyed on the shaft 74 preferably has flanges on its sides to hold the driven gear 76 in driving contact. The gear 74 engages the top of the box shaped housing 75 and is thus positioned relative to gear 76 which has its axle 77 immovable longitudinally. Since the gear 74 is slidably keyed on the shaft 73, the roller 13 is properly driven for any position of the housing. The shaft 73 is held parallel with the cone surface by the framework 14, 15 parallel thereto which controls the position of the housing.

For adjusting the roller 13 longitudinally of the cone, I have provided mechanism for moving the housing 75 laterally to release the roller from the cone or to cause a driving engagement. To this end, a channel member 80 fixed on the top of the housing projects rearwardly beyond the uprights 14 and 15 between which it is movable. An axle 81 mounted in the sides of the channel has a lever 82 pivotally mounted on the end of the axle outside of the channel. This lever 82 of the first class has a roll 83 pivotally mounted on its inner end which is arranged to ride on or to be free of the face of the calibrated scale strip 79 which is carried by the upright 15. A lever 85 within the housing depends from a pivot 84 carried by the channel 80, and it is connected at an intermediate point with the end of the shaft of roll 83 on lever 82 by means of a link 86 inside the channel. The lower end of lever 85 located in the housing 75 has a fork 87 straddling a slide rod 89 and engages the rear of a button on the end of the slide rod. That rod is mounted to slide within a bearing in the wall of the housing 75. The rod 89 projects outwardly of the housing and has a brake shoe 90 on its end which is movable to engage the rear face of the upright 15, as shown in FIG. 4, when moved by a compression spring 92 on the rod 89 to that effect. When the level 82 is swung up to the position of FIG. 5, the roll 83 is moved past dead center in contact with the upright 15, and forces the housing towards the right. The brake shoe is at the same time released by lever 85 from contact with the upright. A roll 93 is suitably mounted in bearings (not shown) carried by the housing 75, and in the position of FIG. 5 this roll engages the left side of the upright 15 opposite the roll 83. In this case, the housing 75 is free to be moved up or down, as guided by the rolls 83, 93, to adjust the position of contact of driving roll 13 on the cone 12. When the lever 82 is swung down and permits spring 92 to clamp the brake shoe against the upright 15, the spring thrusts the housing 75 towards the left and forces the driving roller 13 into contact with the cone. That spring in the position of FIG. 5 has been compressed by the lever 85 being forced to the left. The spring moves the housing towards the left when released by the lever 85 and when the roll 83 is free from the standard 15. In the position of FIG. 4, the rolls 83 and 93 do not engage the upright 15. In the position of FIG. 5, the roll 83 holds the driving roll 13 away from the cone. Various constructions may be employed, if desired, to insure that the driving roller 13 does not vary in its contact position on the cone. Also the cone 12, or an extra scale mounted on the framework, may be marked to cooperate with an indicator on the housing which will serve to indicate the number of satellite orbits per one rotation of the globe. That is, the scale may be marked with the numbers 4 at the bottom to 18 at the top and properly located.

If the angularity of the orbit path to the earth equator and the relationship of the number of satellite orbits per rotation of the earth are known, then the position of the satellite may be found. The satellite orbit marker on the instrument may be set at the given point of takeoff on the globe maps and the index 55 on the ring 53 is set at the angle on scale 52 according to the angle of takeoff of the satellite. The roller 13 is moved to the required position which the scale 79, or a scale on the cone, indicates for the satellite velocity, and the roller is brought into contact with the cone by operating the handle 82.

The marker is then revolved, and when it is opposite or near the observer's location on the earth, it is stopped. The number of orbits, including any fractional portion, is counted, and since the scale gives the time period of a single orbit, the observer may readily calculate the time that has elapsed since the send off, and he can then ascertain when the satellite will be visible at his locality. The marker position relative to the observer's location on the earth will indicate what quadrant of the sky should be searched for seeing the satellite. Various phases of a satellite orbit may thus be shown.

It will be appreciated that the apparatus above described may be added to or simplified or variously modified or refined within the scope of this invention and that the above description of one embodiment of the invention is not to be interpreted as imposing limitations on the appended claims.

I claim:
1. In a satellite orbit demonstrating apparatus having a rotatable earth-simulating globe, a satellite, an arm carrying said satellite which revolves it about the globe in a diametrical plane of the globe, means for angularly varying said plane relative to the globe equator, and driving mechanism for rotating the globe and revolving the satellite for the various angular positions of the satellite, that improvement in the construction in which the driving mechanism comprises a cone axially aligned and connected to rotate with the globe, a shaft arranged parallel with the tapering surface of the cone, a friction roller in keyed relationship with said shaft and movable along said shaft to vary its point of rotative relationship with said surface, mechanism for adjustably positioning the roller against said surface at a selected cone diameter to vary the relative speeds of the globe and satellite, said cone and roller being driven members, power mechanism connected to drive one of said members, and driving connections between said shaft and the satellite for all positions of the latter.

2. An apparatus according to claim 1 in which the satellite is a marker located to draw lines on the rotating globe, and comprising resilient means to hold the marker removably against the globe.

3. An apparatus according to claim 1 comprising a manually operated crank connected to rotate the shaft, and wherein the positively driven roller on said shaft serves to rotate the cone and globe at a controlled rate.

4. An apparatus according to claim 1 comprising a supporting frame parallel with the cone surface, and a manually operable clamping device positioned by and movable along said frame which serves to releasably engage said roller with the cone surface at a selected driving position.

5. An apparatus according to claim 4 in which the clamping device comprises a housing carrying the friction roller, a spring actuated device for moving the housing relative to the frame to urge the roller into contact with the cone, and a manually operable lever mechanism to move the housing and roller away from the cone against the force of the spring so that the housing and roller may be readily adjusted relative to the cone.

References Cited by the Examiner

UNITED STATES PATENTS

| | | | |
|---|---|---|---|
| 1,050,704 | 1/13 | Sparks | 74—191 X |
| 1,207,868 | 12/16 | Craighead | 35—46 |
| 2,579,105 | 12/61 | Baldine | 35—29 |
| 2,985,969 | 5/61 | Farquhar | 35—47 |
| 3,028,687 | 4/62 | Johnson | 35—46 |

EUGENE R. CAPOZIO, *Primary Examiner.*

JEROME SCHNALL, *Examiner.*